United States Patent Office 3,370,073
Patented Feb. 20, 1968

3,370,073
OXIDATION OF OLEFINICALLY UNSATURATED
HYDROCARBONS TO CARBONYL COMPOUNDS
William H. Clement, Blairsville, and Charles M. Selwitz, Pitcairn, Pa., assignors to Gulf Research & Development Company, Pittsburgh, Pa., a corporation of Delaware
No Drawing. Filed July 11, 1963, Ser. No. 294,253
24 Claims. (Cl. 260—406)

This invention relates to an improvement in the preparation of carbonyl compounds by the oxidation of olefinically unsaturated compounds having at least six carbon atoms per molecule and, more particularly, to the preparation of methyl ketones from alpha-olefins having at least six carbon atoms per molecule.

In recent years the so-called "Consortium" or Wacker process has been developed for the preparation of carbonyl compounds by the oxidation of ethylenically unsaturated hydrocarbons and, in particular, for the preparation of acetaldehyde from ethylene. The Consortium process is described, for example, in "Catalytic Reactions of Olefins on Platinum Metal Compounds" Angewandte Chemie 71, 176–182 (1959). The Consortium process suffers, however, from certain disadvantages, such as reduced conversions and isomerization of the charge stock and products when olefinically unsaturated compounds having six carbon atoms per molecule, or over, are utilized as the charge stocks. These disadvantages have been overcome by the improved process of the subject invention which uses a selective solvent to be hereinafter defined.

In accordance with the invention, a carbonyl containing compound is prepared in an improved yield from an olefinically unsaturated compound having at least six carbon atoms per molecule and at least one hydrogen atom on each carbon atom of at least one olefinic double bond by a process which comprises adding the olefinically unsaturated compound to a reaction mixture comprising an aqueous solution of a compound of a metal of the platinum group, an oxidizing agent having an oxidation potential higher than that of the platinum group metal and a solvent which has a dielectric constant at 25° C. of at least 20, and is such that between 0.5 and 5 volumes of dodecene-1 are soluble at a temperature of 25° C. in a mixture of 50 volumes of solvent and 7 volumes of water. In one preferred embodiment of this invention, an inorganic oxidizing agent is employed and an oxidizing gas is continuously bubbled through the reaction mixture. In yet another preferred embodiment of this invention, carbonyl containing compounds are prepared in improved yields in a continuous manner by a process which comprises continuously adding an olefinically unsaturated compound having at least six carbon atoms per molecule at a rate equivalent to the rate of reaction of the olefinically unsaturated compound, and continuously adding an oxidizing gas to a reaction mixture comprising an aqueous solution of a compound of a metal of the platinum group, an oxidizing agent having an oxidation potential higher than that of the platinum group metal and a solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water.

As noted above, the conversion of ethylene to acetaldehyde by the Consortium process is known in the art. It has been found that the conversion of higher molecular weight unsaturated compounds, such as olefinically unsaturated compounds having six carbon atoms, or more, per molecule was very poor using the aqueous hydrochloric acid reaction medium described in the art. It was initially thought that increased conversions of the higher molecular weight olefinically unsaturated compounds could be achieved by employing a solvent which would essentially completely dissolve these higher molecular weight compounds in the reaction mixture. This, however, has not been found to be true. It has been found quite unexpectedly that certain solvents, such as methanol and dimethylformamide which have only limited solubility for the higher molecular weight olefinically unsaturated compounds, dramatically increase the conversion of the olefinically unsaturated compounds to the desired products. On the other hand, solvents such as acetic acid and tetrahydrofuran, which are far superior from a solubilizing viewpoint, result in very poor conversions of the higher molecular weight olefinically unsaturated charge stocks. It has been found that the desirable solvents are those compounds or mixtures of compounds which possess relatively low olefin solubilizing properties and relatively high dielectric strength. Both properties are essential. Solvents having the requisite dielectric strength but which are outside the solubility limits to be described below, result in poor conversions as do solvents which have the requisite solubility but fail to meet the dielectric strength requirements. In particular, it has been found that a suitable solvent for the process of this invention comprises any compound or mixture of compounds which has a dielectric constant of at least 20 at 25° C. and which has solubility characteristics such that between 0.5 and 5.0 volumes of dodecene-1 are soluble at 25° C. in a mixture of 50 volumes of solvent and 7 volumes of water. It is preferred that the solvent be an organic compound or mixture of compounds liquid under reaction conditions, and which has a dielectric constant at 25° C. between 20 and 60 and more preferably a dielectric constant at 25° C. between 30 and 40, and which has solubility characteristics such that between 0.5 and 5.0 volumes of dodecene-1 are soluble at 25° C. in a mixture of 50 volumes of solvent and 7 volumes of water.

For a continuous process it is preferred that the solvent be an organic compound or mixture of compounds liquid under reaction conditions which has a dielectric constant of at least 20 at 25° C. and which has solubility characteristics such that between 0.5 and 1.5 volumes of dodecene-1 are soluble in a mixture of 50 volumes of solvent and 7 volumes of water. The most preferred solvent is methanol which is relatively inexpensive, stable, and results in excellent olefin conversions. Other suitable solvents include dimethylformamide, ethanol and dimethylacetamide. The suitability of any particular compound or mixture for use as a solvent can easily be determined by one skilled in the art by obtaining the dielectric constant of the compound at 25° C. and determining if the solubility characteristics are suitable by the simple test procedure outlined above.

The charge stock can be any olefinically unsaturated compound having at least six carbon atoms per molecule and which has at least one hydrogen atom on each carbon atom of at least one olefinic double bond. The charge stock is preferably an olefinically unsaturated compound which has between 6 and 40 carbon atoms per molecule and more preferably between 6 and 20 carbon atoms per molecule. In addition, the preferred charge stocks are the olefinically unsaturated hydrocarbons having between 1 and 4 olefinic double bonds. The more preferred charge stocks are the aliphatic monoolefinic hydrocarbons having between 6 and 20 carbon atoms per molecule. The most preferred charge stocks are the aliphatic alpha monoolefinic hydrocarbons having between 6 and 20 carbon atoms per molecule. Suitable specific examples of olefinic unsaturated compounds include hexene-1;
heptene-1;
octene-1;
nonene-1;
decene-1;
undecene-1;
dodecene-1;
tridecene-1;
tetradecene-1;
pentadecene-1;
hexadecene-1;
heptadecene-1;
octadecene-1;
nonadecene-1;
eicosene-1;
heneicosene-1;
docosene-1;
tricosene-1;
tetracosene-1;
pentacosene-1;
hexacosene-1;
heptacosene-1;
octacosene-1;
nonacosene-1;
triacontene-1;
hentriacontene-1;
dotriacontene-1;
tritriacontene-1;
tetratriacontene-1;
nonene-3;
decene-4;
7-methyldecene-2;
7-methyldecene-1;
6,9-diethylundecene-1;
5,7-dimethyldodecene-1;
4,7,9-trimethyltridecene-1;
5-butyltetradecadiene-1,5;
8-phenylpentadecene-1;
7-cyclohexylhexadecene-1;
11(alpha-cumyl)heptadecene-1;
6-butyloctadecadiene-1,11;
5-(2-norbornyl)nonadecene-1;
6-ethyleicosene-1;
8-t-butyltricosene-1;
7-phenyldocosene-1;
4-methyloctene-1;
4-methylpentadecene-1;
5-methylpentadecene-1;
8-methylpentadecene-1;
9-methylpentadecene-1;
10-phenyldecene-1;
10-cyclohexyldecene-1;
10-cyclooctyldecene-1;
4,5,6,7-tetramethyloctene-1;
4,6,7-trimethyldecene-1;
4,6,7-trimethyldodecene-1;
7-hydroxyoctene-1;
9-chlorononene-1;
5-methoxydecene-1;
7,11-diphenylundecene-1;
11-dodecen-1-al;
8-ketotridecene-1;
9-aminotetradecene-1;
14-cyanopentadecene-1;
10-undecenoic acid;
15-n-hexadecenoic acid;
isooctyl 16-heptadecenoate;
12-(alpha-cumyl)octadecene-1;
14-ketononadecene-1;
20-N-acetoxyaminoeicosene-1;
17,18-dinitroheneicosene-1;
22-p-tolyldocosene-1;
20-(b-thieno)tricosene-1;
20-(alpha-naphthyl)tetracosene-1;
12-keto-23-thiapentacosene-1;
12-hydroxyhexacosene-1;
17-bromoheptacosene-1;
28-cyanooctacosene-1;
20-acetoxynonacosene-1;
18-butoxytriacontene-1;
9-mercaptohentriacontene-1;
30-thiadotriacontene-1;
30-oxatritriacontene-1;
24-azatetratriacontene-1;
4-trimethylsilylhexene-1;
1,2-epoxyheptene-6;
2-(7-methyl-11-decenyl)-1,4-benzoquinone;
10,11-difluoro-6,9-diethylundecene-1;
5,7-dimethyl-6-oxadodecene-1;
4,7-dimethyltridec-1-ene-9,10,11,12-tetracarboxylic dianhydride;
4-butyltetradecandiene-1,5;
8-(p-chloromercuriphenyl)pentadecene-1;
7-(4-nitrocyclohexyl)hexadecene-1;
11-(alpha-cumyl)heptadecene-1;
6-(para-isopropylphenyl)decene-1;
10-(2-norbornyl)nonadecene-1;
6-butyloctadecadiene-1,11;
8-t-butyl-12-(2-[4-dichloromethyltetrahydrofuryl]) tetradecene-1;
7-phenyl-10-(2-[6,6-dibromo-3-oxabicyclo(3.1.0) hexyl])docosene-1;
4-methyloctene-1;
4-methylpentadecatetraene-1,4,7,12;
Diethyl 14-pentadecenylsuccinate;
8-diazomethylpentadecene-1;
9-carboxymethylpentadecene-1;
10-(2,3-diiodophenyl)decene-1;
10-(1,4-cyclohexadienyl)decene-1;
10-cyclopentyldecadiene-1,10;
4,7-diketo-10-cyclooctyldecene-1;
4,5,6,7-tetrachloromethyloctene-1;
4,6,7-trinitromethyldecene-1; and
4,6,7-tri(phenoxymethyl)dodecene-1.

Mixtures of olefinically unsaturated compounds can also be employed. Suitable mixtures of olefinically unsaturated compounds are olefins obtained by the thermal cracking of wax and from the polymerization of ethylene.

The products from the reaction are carbonyl containing compounds which include ketones, aldehydes and organic acids. The principal product is the ketone, and if an alpha-olefin is utilized as the charge material, a methyl ketone is almost exclusively the product obtained.

Materials such as mercaptans and amines which form stronger ligand bonds with the platinum group metal compound than does the olefin charge stock are, of course, unsuitable charge stock components and should suitably be removed.

The olefinically unsaturated charge stock is added to the aqueous solution of the platinum group metal compound and the reaction solvent. The rate of addition of the olefinically unsaturated compound to the reaction mixture is important. It has been found that if the olefin is added too fast, conversion to the desired products is poor. It is preferred that the olefinically unsaturated compound be added to the reaction mixture at a rate equivalent to the rate at which the olefin is being reacted. This rate will, of course, vary depending on the particular charge stock employed, the type and amount of catalyst and the reaction conditions. Anyone skilled in the art with the above teachings before him can determine by a few simple tests, the proper rate of addition of a particular charge stock to a given reaction mixture under a desired set of operating conditions. The rate of addition is usually between 0.01 and 10 ft.$^3$ per hour per ft.$^3$ of reactor volume and preferably between 0.10 and 1.0 ft.$^3$ per hour per ft.$^3$ of reactor volume.

The process of the present invention can be carried out with a catalyst comprising a compound of a noble metal of Group VIII of the Periodic Table (a platinum group metal compound) which includes metals, such as ruthenium, rhodium, palladium, osmium, iridium and platinum. The preferred metal compounds are those of palladium and platinum. It is still more preferred to use the water soluble salts of palladium and platinum, such as the halides, sulfates or phosphates. The most preferred catalyst is palladium chloride. Suitable specific examples of catalysts which can be used either alone or in admixture to promote the process of the subject invention include platinum chloride, platinum sulfate, palladium acetate, palladium chloride and palladium sulfate.

The amount of the platinum group metal compound required to promote the subject reaction can vary over a wide range. When the aqueous solution of metal salts is employed, the weight percent of the platinum group metal compound based on the reaction mixture before the olefin is added can vary between 0.01 and 20 weight percent, and preferably between 0.1 and 10 weight percent.

In the subject process the platinum group metal compound is reduced while promoting the oxidation of the olefin by forming a complex with the olefinically unsaturated compound which then decomposes to form the platinum group metal and the carbonyl compound. The reduced platinum group metal compound is inactive to promote further oxidation until it is again in a proper oxidation state. It is preferred to also have present in the reaction mixture an oxidizing agent which, while not reacting with the olefinically unsaturated compound, the reaction solvent or the reaction products would be capable of oxidizing the platinum group metal compound to an active state. Thus, the platinum group metal compound could be used in stoichiometric quantities to produce the desired carbonyl compounds, but in order for the platinum group metal compound to function as a catalyst and not as a reactant, it must be re-oxidized to the proper valence state. In view of the expense of the platinum group metal compounds, the re-oxidation of the platinum group metal compound is the only practical means of operating the subject process. It is therefore preferred to have present in the reaction mixture an oxidizing agent which has an oxidation potential higher than that of the platinum group metal compound employed. The oxidation potential of any particular agent can be determined from the International Critical Tables or other literature sources, or by suitable known testing procedures.

It would be desirable, of course, to re-oxidize the platinum group metal with an oxidizing gas, such as oxygen, but this reaction does not occur readily. It has been found that certain organic compounds, for example the quinones, are suitable oxidizing agents. For example, ortho- and paraquinones, such as benzoquinone, naphthaquinones, anthraquinones, phenanthrenequinones, or the alkyl substitution products of such quinones or the sulfonic or carboxylic acid derivatives of said quinones can be employed, so long as the oxidation potential of the quinone is higher than that of the platinum group metal. Specific examples of suitable quinones include 2-methyl-1,4-benzoquinone; 9,10-phenanthrenequinone; 7-butylnaphthaquinone; anthraquinone-1-carboxylic acid; 1,2-naphthaquinone-4-sulfonic acid; 2,3,5,6-tetrachloro-1,4-benzoquinone; and duroquinone.

Other organic oxidizing agents can also suitably be employed, such as the organic peroxides, organic halamides, organic halimides and organic hypohalites. Specific examples of suitable compounds include t-butyl hydroperoxide, cumene hydroperoxide, di-t-butyl peroxide, diacetyl peroxide, N-chloroacetamide, N-bromo succinimide, t-butylhypochlorite and trifluoroperacetic acid.

Inorganic oxidizing agents can also be employed. These include compounds such as ozone, hydrogen peroxide, sodium peroxide or compounds of the higher valence state of metals such as copper, iron, cobalt, nickel, manganese, chromium, lead, vanadium and others.

The organic oxidizing agents and many of the inorganic oxidizing agents are equally difficult to reoxidize with an oxygen containing gas. It is consequently still further preferred to employ a redox system comprising an oxidizing agent which has an oxidation potential higher than that of the platinum group meal and an oxygen containing gas, said oxidizing agent being such that it is itself re-oxidized with an oxygen containing gas. A class of compounds which satisfy this criterion includes the compounds of copper, iron, cobalt, manganese and nickel. Particularly preferred are the halide derivatives of copper, and most preferred is copper chloride.

The amount or concentration of the oxidizing agent will vary depending, in part, on whether it is employed alone or as part of a redox system. In the case where the oxidizing agent is employed alone, such as where a quinone is used, the amount of oxidizing agent can vary between 1 and 50 weight percent of the total reaction mixture with preferred amounts between 5 and 25 weight percent.

Where a redox system is employed, the molar ratio of the sum of the redox metals to the platinum group metal is at least 1:10 and preferably between 1:1 and 100:1.

Water must also be present in the reaction system. The function of the water is to aid in solubilizing the platinum group metal compound and to provide the necessary oxygen to form the desired carbonyl containing compound from the decomposition of the platinum metal group compound-olefin complex. In general, the amount of water can vary between 1 and 50 weight percent of the reaction solvent with preferred concentrations between 2 and 30 weight percent. The most preferred concentrations will depend in part on the solvent employed. For example, when dimethylformamide is employed as the solvent, the preferred water concentration is between 5 and 20 weight percent. Too low a water concentration results in a slow reaction rate and a decreased selectivity to the desired carbonyl containing compound due to olefin isomerization. Too high a water concentration results in poor olefin solubility with the consequent low conversions.

When a redox system is employed which utilizes an oxygen containing gas to re-oxidize the redox metal, then any oxygen containing gas can suitably be employed, for example, air, oxygen, oxygen enriched air or air diluted with an inert gas, such as nitrogen. The rate of addition of the oxygen containing gas will depend, of course, on the oxygen content, but in general should be such as to substantially completely react while in the reaction zone. The preferred oxygen containing gases are those having an oxygen content between 5 and 100 weight percent and for these preferred oxygen containing gases the rate of addition is generally between 1 and 100 and preferably between 10 and 60 cubic feet per hour per cubic foot of reactor volume.

The subject process can be run in a semi-batch type reactor where the olefinically unsaturated charge stock is continuously added, and in those cases where desired, an oxygen containing gas is also continuously added. The subject process can also be run in a continuous manner. A continuous process is particularly desirable when the solvent which is employed has solubility characteristics such that between 0.5 and 1.5 volumes of dodecene-1 are soluble in a mixture of 50 parts by volume of the sovent and 7 parts by volume of water. A continuous reaction is particularly preferred when the above solvent is employed since the unreacted charge and product readily separate from the catalyst-solvent mixture and can be continuously removed from an upper phase. The desired product carbonyl compound is readily obtained by distillation of the removed upper phase. If a solvent having higher solubilizing power is employed, but within the limits earlier defined, a continuous operation is possible, but additional difficulties are encountered in separating and recycling or otherwise treating the reaction solvent and catalyst.

The reaction conditions should be such that the reactants are maintained essentially completely in the liquid phase. The reaction temperature can be between about 0° and 150° C., preferably between 20° and 100° C. and more preferably between 60° and 70° C.

Atmospheric or even a reduced pressure can be used at the lower reaction temperatures. Pressures up to 100 atmospheres or more can, however, also be used, if desired. The function of the pressure is, as noted above, to maintain the solvent and the aqueous solution of catalyst in the liquid phase.

The reaction time should be sufficient for the olefinically unsaturated compound to be converted to the desired carbonyl containing compound. Reaction times between 0.1 and 10 hours are generally satisfactory. Reaction times below 0.1 hour are generally unsatisfactory from a conversion viewpoint while reaction times above about 10 hours provide no additional benefits.

The process will be further described with reference to the following specific examples.

*Example 1*

A solution containing 0.010 mol (1.8 grams) of $PdCl_2$; 0.050 mol (5.4 grams) of p-benzoquinone; 0.140 mol (2.5 grams) of water and 25 milliliters of dimethylformamide was prepared. To this solution was added 8.4 grams of hexene-1 with vigorous stirring at room temperature (25° C.). An immediate exotherm was observed which was controlled by an ice water bath from 50° C. to 25° C. in five minutes. The temperature was then held at 25° C. without the ice water bath. The solution was stirred at room temperature for twenty hours and then flooded with an excess solution of saturated sodium chloride to stop the reaction. The organic layer was separated and analyzed by vapor phase chromatography. The product showed 0.0416 mol of ketone (98 percent 2-hexanone) giving a ketone yield of 69 percent.

*Example 2*

Example 1 was repeated except the olefin charge was dodecene-1, the reaction temperature was higher, the quantities of materials used in the reaction mixture were doubled and the olefin was added dropwise to the solution with stirring over a three-hour period. Before the dodecene-1 was added, the mixture of palladium chloride, quinone, dimethylformamide and water were mixed and heated to 60° to 70° C. The olefin was then added dropwise to the solution with stirring over a three-hour period. After an additional 0.5 hour of reaction there was a 21 percent conversion of the dodecene-1 to 2-dodecanone.

Examples 1 and 2 above illustrate that an organic oxidizing agent can be used to promote the formation of carbonyl compounds from alpha-olefins in the presence of a platinum group metal compound.

The following examples illustrate the use of an inorganic oxidizing agent in a redox system to promote the formation of carbonyl compounds from alpha-olefins in the presence of a platinum group metal compound and a solvent as hereinbefore defined.

*Example 3*

A reaction mixture was prepared, consisting of 0.02 mol (3.56 grams) of palladium chloride ($PdCl_2$); 0.02 mol (3.40 grams) of copper chloride ($CuCl_2 \cdot 2H_2O$); 7 grams of water; and 50 milliliters of dimethylformamide. The temperature of the reaction mixture was increased to 60° C. Oxygen at the rate of 3.3 liters per hour was passed through the solution and dodecene-1 was added continuously over a two and one-half hour period into the reaction phase with stirring. The total amount of added olefin was 0.20 mol (33.6 grams). The reaction temperature was maintained between 60° and 70° C. Following complete addition of the olefin, the reaction mixture was stirred an additional 0.5 hour at 60° to 70° C. Analysis of the product by vapor phase chromatography showed that 84 percent of the dodecene-1 was converted at a 95 percent efficiency to the $C_{12}$ ketone. The ketone was 96 percent dodecanone-2.

Example 3 was repeated several times. The range of alpha-olefin conversion was between 84 and 93 percent. The efficiency to ketone was greater than 95 percent and the ketone product was 96 to 98 percent dodecanone-2.

*Example 4*

Example 3 was repeated except only five grams of water were employed (instead of 7) and all of the olefin was added initially to the reaction mixture. The reaction was then heated to 60° C. The reaction exothermed to 65° C. and returned to 60° C. in fifteen minutes. The temperature was held at 60° C. with controlled heat. After 6¼ hours the reaction essentially ceased. The reaction was run an additional 22 hours but no further reaction was detected. Analysis by vapor phase chromatography showed that approximately 50 percent of the olefin was converted to a $C_{12}$ ketone. The other 50 percent unreacted olefin was isomerized.

A comparison of Example 4 with Example 3 shows that it is important to add the olefinically unsaturated charge material to the reaction mixture at a slow rate in order to achieve the best conversions to the desired ketone.

*Example 5*

Example 3 was repeated except 6 grams of water were used in place of the 7 grams and hexadecene-1 was employed as the olefinically unsaturated charge material. Analysis of the product showed that 80 percent of the hexadecene-1 was converted to the desired methyl ketone.

*Example 6*

Example 3 was repeated except 27.6 grams of liquid 10-undecenoic acid (Melting Point 24.5° C.) were used as the olefinically unsaturated charge stock in place of the dodecene-1. A solid product (25.5 grams) having a melting point of 52° C. was obtained. Purification of this solid gave 11 grams of a solid material having a melting point of 57–58° C. and a neutral equivalent of 280. The calculated neutral equivalent for 10-ketoundecanoic acid is 282.

*Example 7*

Example 3 was repeated except methanol was employed as the reaction solvent. Analysis of the product showed that 91 percent of the dodecene-1 was converted to ketone, and the percent of 2-dodecanone was 87 percent.

*Example 8*

Example 3 was repeated except ethanol was used as the reaction solvent. Analysis of the product showed that 95 percent of the dodecene-1 was converted. The yield of ketone was 82 percent while the percentage of 2-dodecanone in the product was 97 percent.

*Example 9*

Example 3 was repeated except dimethylacetamide was used as the reaction solvent. Analysis of the product showed that the conversion of dodecene-1 to ketone was 76 percent.

The comparison of Examples 3, 7, 8 and 9 shows that dimethylformamide, methanol, ethanol and dimethylacetamide are suitable solvents for the subject reaction. The solubility of dodecene-1 in a mixture of 50 volumes of each of the solvents and 7 volumes of water at 25° C. was respectively 1, 1, 4 and 1 volumes while the dielectric constants of the four solvents at 25° C. was respectively 37, 33, 24 and 37.8. Each of these four solvents, therefore, meets the criteria of having good dielectric strength with limited solubility of the charge olefin.

The following five examples illustrate the use of solvents which have been found to be inferior for the process of the subject invention.

*Example 10*

Example 3 was repeated except acetic acid was utilized as the reaction solvent. Acetic acid was found to have a solubility on the scale defined above of 1.5 volumes of dodecene-1 in a mixture of 50 volumes of acetic acid and 7 volumes of water at 25° C., which is within the desirable limited solubility range found by the applicants. The dielectric constant of acetic acid at 25° C., however, is 6. The conversion of dodecene-1 was found to be only 11 percent.

A comparison of Example 10 with Example 3 shows that acetic acid is an unsuitable solvent for the preparation of carbonyl compounds from the higher molecular weight olefinically unsaturated charge stocks as defined by the process of this invention.

*Example 11*

Example 3 was repeated except acetone was employed as the reaction solvent. The relative solubility of acetone on the scale described above was 8 while the dielectric constant of acetone at 25° C. is 21. The percent conversion of dodecene-1 to dodecanone-2 was 41 percent.

A comparison of Example 11 with Example 3 shows that a much lower conversion to dodecanone was obtained. It is seen that the acetone has too high a solubility while just managing to have the proper dielectric strength.

*Example 12*

Example 3 was repeated except the solvent was tetrahydrofuran. Tetrahydrofuran was found to have a relative solubility on the scale described above of 11.5 and dielectric constant at 25° C. of 7. A percentage conversion of dodecene-1 to dodecanone was 46.

A comparison of Example 12 with Example 3 shows that tetrahydrofuran is also an inferior solvent for the conversion of the higher molecular weight olefinically unsaturated compounds since tetrahydrofuran does not meet the solubility and dielectric properties as defined above.

*Example 13*

Example 3 was repeated except the solvent was dimethylsulfoxide. The solubility of dodecene-1 in a mixture of 50 volumes of dimethylsulfoxide and 7 volumes of water was less than 0.5. The dielectric constant of dimethylsulfoxide at 25° C. was 45. The percentage conversion of dodecene-1 was less than 10.

A comparison of Example 13 with Example 3 shows that while dimethylsulfoxide has the proper dielectric strength, its relative solubility is too low and thus the conversion of dodecene-1 was very poor.

*Example 14*

Example 3 was repeated except the solvent was dioxane. The solubility of dodecene-1 in a mixture of 50 volumes of dioxane and 7 volumes of water at 25° C. is 3.5 volumes. The dielectric constant of dioxane at 25° C. is about 2.28. The percentage conversion of dodecene-1 was only 25. Dioxane is thus an inferior solvent for the charge stocks of this invention.

A comparison of Examples 10 through 14 with Examples 3, 7, 8 and 9 shows that in order to achieve excellent conversions of the higher molecular weight olefinically unsaturated compounds of this invention, a solvent having the criteria of solubility and dielectric strength as defined above must be employed.

*Example 15*

Example 3 was again repeated except the reaction temperature was held between 40° C. and 50° C. As a result the percentage conversion of the dodecene-1 to dodecanone was reduced to 52 percent.

*Example 16*

Example 3 was again repeated except the reaction temperature was increased to between 80° C. and 90° C. The result was that the percentage conversion of dodecene-1 to dodecanone was reduced to 62 percent.

A comparison of Examples 3, 15 and 16 shows that an optimum temperature for the conversion of dodecene-1 to dodeconone is between 60° C. and 70° C.

The following four examples illustrate the effect of the water concentration on the conversion of the dodecene-1.

*Example 17*

Example 3 was repeated except the ratio of water to dimethylformamide was lowered to 3.5 volumes of water per 50 volumes of dimethylformamide (6.9 weight percent water). The conversion of dodecene-1 was 86 percent, and the yield of ketone was 78 percent.

*Example 18*

Example 3 was repeated except the volume ratio of water to dimethylformamide was increased to 10 volumes of water per 50 volumes of solvent (17.4 weight percent water). The result was a conversion of dodecene-1 of 89 percent, and a yield of ketone of 85 percent.

*Example 19*

Example 3 was repeated except the volume ratio of water to dimethylformamide was increased to 15 volumes of water per 40 volumes of solvent (28.4 weight percent water). The percentage conversion of the dodecene-1 to dodecanone was reduced to 51 percent.

*Example 20*

Example 3 was repeated except the volume ratio of water to dimethylformamide was increased to 25 volumes of water per 25 volumes of solvent (51.2 percent water). The conversion of dodecene-1 to dodecanone dropped sharply to 21 percent.

A comparison of Examples 3, 17, 18, 19 and 20 shows the best conversions and yields of ketone were obtained with solvent systems containing between 5 and 20 weight percent water.

*Example 21*

Example 3 was repeated. Following the completion of the reaction the upper phase was removed. The volume of the lower reaction phase was found to be reduced by 10 milliliters. The reaction phase was returned to its original volume by adding 10 milliliters of fresh catalyst solution. Two-tenths (0.20) mol of dodecene-1 were again added dropwise as in Example 3 above. Similarly a third feed of 0.20 mol of olefin was added to the remaining catalyst solution from the second run. The results showed that the percentage conversion of dodecene-1 actually increased. Thus, the percentage conversion of dodecene-1 in the first stage was 84 percent, in the second stage was 92 percent, and in the third stage was 93 percent.

Example 21 illustrates that a continuous or semi-continuous process is possible and indeed desirable with the charge stocks and solvents of the subject process.

*Example 22*

Example 3 was repeated except the dimethylformamide was omitted and the amount of water was increased to 25 milliliters. The dodecene-1 failed to react. Thus a reaction solvent as defined above is essential to the reaction of the charge stocks of this invention.

Certain solvents, such as dimethylformamide which are suitable for the subject process hydrolize slowly in an acid medium and consequently are not preferred to be employed in combination with acids such as hydrochloric acid. Other solvents, however, such as methanol do not hydrolyze in acid solution and a hydrochloric acid medium can more suitably be employed, if desired, as shown by the following example.

*Example 23*

Example 7 was repeated using 10 instead of 7 grams of water and the solvent was acidified to 0.01 normal with hydrochloric acid. The olefin was added over a 3¼ hour period. Analysis of the product showed that 90 percent of the alpha-olefin was converted at an 88 percent efficiency to dodecanone. The product was 90 percent 2-dodecanone.

*Example 24*

A reaction mixture was prepared consisting of 0.0395 mol (9.0 grams) of palladium chloride ($PdCl_2$); 0.4270 mol (103.0 grams) of copper nitrate ($Cu(NO_3)_2 \cdot 3H_2O$); 75 milliliters of water; 6 milliliters of 12 normal hydrochloric acid; and 0.3580 mols (30.0 grams) of hexene-1. Oxygen in the approximate rate of 2 milliliters per minute was passed through the reaction mixture and an oxygen pressure of 80 millimeters was maintained throughout the run. There was a slight exotherm on addition of the olefin (29° to 38° C. over 20 minutes). The reaction was heated to 40° C. and exothermed to about 60° C. between 2 and 3 hours of reaction. The temperature was returned and held at 40° C. until a total reaction time of 6 hours had elapsed. The weight percent conversion of hexene-1 to ketone was only 13 percent. The ketone product consisted of about equal parts of hexanone-2 and hexanone-3.

Example 24 shows that with the charge stocks of the present invention, conversion to the desired carbonyl containing compounds is poor in the absence of a solvent as defined above.

The subject process has a number of advantages over processes known in the art for the conversion of olefinically unsaturated compounds having six carbon atoms, or more, per molecule. When using solvents as defined above and employing alpha-olefins having at least six carbon atoms per molecule, excellent yields of higher molecular weight methyl ketones of high purity are obtained. One of the disadvantages of processes in the prior art, such as the use of aqueous hydrochloric acid as the solvent, was the formation of undesired internal ketones. By employing an aqueous dimethylformamide solvent and utilizing a regulated feed of olefin into the catalyst solution, it has been found possible to obtain product yields of greater than 80 percent, using dodecene-1 as the feed stock. The ketone which forms is 96 to 99 percent methyl ketone. It should be remembered that isomerization of the alpha-olefin is always a competing reaction with the consequent formation of the internal ketones. For reasons which are not fully understood, the use of solvents as defined above greatly improves not only the yield of ketones obtained in the reaction, but also the selectivity to the desired methyl ketones.

When it is desirous to avoid the use of an oxygen containing gas for fear of degradation of the product, or otherwise, the various quinones, such as parabenzoquinone, are readily utilized to re-oxidize the platinum group metal catalyst.

Resort may be had to such variations and modifications as fall within the spirit of the invention and the scope of the appended claims.

We claim:
1. A process for the preparation of carbonyl containing compounds which comprises adding an unsaturated hydrocarbon having between 6 and 40 carbon atoms per molecule and wherein the unsaturation in said hydrocarbon resides solely in from 1 to 4 olefinic double bonds, and wherein there is at least one hydrogen atom on each carbon atom of at least one of said olefinic double bonds to a reaction mixture comprising an aqueous solution of a water soluble salt of a metal of the platinum group, an oxidizing agent having an oxidation potential higher than that of said platinum group metal and a solvent which has a dielectric constant at 25° C. of at least 20 and is such that between 0.5 and 5 volumes of dodecene-1 are soluble at a temperature of 25° C. in a mixture of 50 volumes of solvent and 7 volumes of water; the amount of water in said aqueous solution being between 1 and 50 weight percent of said solvent.

2. A process according to claim 1 wherein said oxidizing agent is an organic oxidizing agent and wherein the olefinically unsaturated hydrocarbon is continuously added to the reaction mixture at a rate equivalent to the rate at which the olefin is reacted to form the desired carbonyl containing compound.

3. A process according to claim 1 wherein an oxidizing gas containing free molecular oxygen as the only oxidant is continuously added to the reaction mixture.

4. A process according to claim 3 wherein the solvent is an organic solvent selected from the group consisting of methanol, dimethylformamide, dimethylacetamide and ethanol.

5. A continuous process for the preparation of carbonyl containing compounds which comprises continuously adding an unsaturated hydrocarbon having between 6 and 40 carbon atoms per molecule and wherein the unsaturation in said hydrocarbon resides solely in from 1 to 4 olefinic double bonds, and wherein there is at least one hydrogen atom on each carbon atom of at least one of said olefinic double bonds at a rate equivalent to the rate of reaction of the olefinically unsaturated hydrocarbon and continuously adding an oxidizing gas containing free molecular oxygen as the only oxidant to a reaction mixture comprising an aqueous solution of a water soluble salt of a metal of the platinum group selected from the class consisting of platinum and palladium, an oxidizing agent having an oxidation potential higher than that of the platinum group metal and a solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water; the amount of water in said aqueous solution being between 1 and 50 weight percent of said solvent.

6. A process according to claim 5 wherein said oxidizing agent is an inorganic oxidizing agent.

7. A process for the preparation of a methyl ketone from an alpha-olefin having between 6 and 40 carbon atoms per molecule and at least one hydrogen atom on each carbon atom of the alpha-olefinic double bond which comprises adding said alpha-olefin to a reaction mixture comprising an aqueous solution of the water soluble salt of a metal of the platinum group, an oxidizing agent having an oxidation potential higher than that of the platinum group metal and a solvent which has a dielectric constant at 25° C. of at least 20 and is such that between 0.5 and 5 volumes of dodecene-1 are soluble at a temperature of 25° C. in a mixture of 50 volumes of solvent and 7 volumes of water; the amount of water in said aqueous solution being between 1 and 50 weight percent of said solvent.

8. A process of the preparation of a methyl ketone from an aliphatic alpha-olefin hydrocarbon having between 6 and 40 carbon atoms per molecule and at least one hydrogen atom on each carbon atom of the alpha-olefinic double bond which comprises adding said alpha-olefin at a rate equivalent to the rate of reaction of said alpha-olefin to a reaction mixture comprising an aqueous solution of a water soluble salt of a metal of the platinum group, an oxidizing agent having an oxidation potential higher than that of the platinum group metal and a solvent selected from the group consisting of methanol, ethanol, dimethylformamide and dimethylacetamide; the amount of water in said aqueous solution being between 1 and 50 weight percent of said solvent.

9. A process for the preparation of a methyl ketone from an aliphatic alpha-olefin hydrocarbon having between 6 and 40 carbon atoms per molecule and at least one hydrogen atom on each carbon atom of the alpha-olefinic double bond which comprises adding said alpha-olefin at a rate equivalent to the rate of reaction of said alpha-olefin to a reaction mixture comprising an aqueous solution of hydrochloric acid, a water soluble salt of a metal of the platinum group selected from the class consisting of platinum and palladium, an oxidizing agent having an oxidation potential higher than that of the platinum group metal and a solvent selected from the group consisting of methanol, ethanol, dimethylformamide and dimethylacetamide; the amount of water in said aqueous solution being between 1 and 50 weight percent of said solvent.

10. A continuous process for the preparation of a methyl ketone from at least one alpha-olefin having between 6 and 40 carbon atoms per molecule and at least one hydrogen atom on each carbon atom of the alpha-olefinic double bond which comprises continuously adding said alpha-olefin at a rate equivalent to the rate of reaction of said alpha-olefin and continuously adding an oxidizing gas containing free molecular oxygen as the only oxidant to a reaction mixture comprising an aqueous solution of a compound of a metal of the platinum group selected from the class consisting of platinum and palladium halides, sulfates and phosphates, an inorganic oxidizing agent having an oxidation potential higher than that of the platinum group metal and an organic solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water; the amount of water in said aqueous solution being between 1 and 50 weight percent of said solvent and continuously removing an organic liquid upper phase and recovering the desired methyl ketone therefrom.

11. A process according to claim 10 wherein the alpha-olefin has between 6 and 20 carbon atoms per molecule.

12. A process according to claim 11 wherein the compound of a metal of the platinum group is selected from the group consisting of platinum and palladium halides.

13. A process according to claim 12 wherein the solvent is an organic solvent selected from the group consisting of dimethylformamide, dimethylacetamide and methanol.

14. A process according to claim 13 wherein the compound of a metal of the platinum group is palladium chloride.

15. A continuous process for the preparation of a methyl ketone from at least one aliphatic alpha-olefin hydrocarbon having between 6 and 20 carbon atoms per molecule and at least one hydrogen atom on each carbon atom of the alpha olefinic double bond which comprises continuously adding said alpha-olefin at a rate equivalent to the rate of reaction of said alpha-olefin and continuously adding an oxidizing gas containing free molecular oxygen as the only oxidant to an aqueous solution of a water soluble palladium salt, a liquid organic solvent which has a dielectric constant at 25° C. of at least 20 and is such that between 0.5 and 1.5 volumes of dodecene-1 are soluble at a temperature of 25° C. in a mixture of 50 volumes of solvent and 7 volumes of water, and an inorganic oxidizing agent soluble in the reaction medium and having an oxidation potential higher than that of palladium, said aqueous solution having a water content between 5 and 20 weight percent of said solvent under conditions including a temperature between 0° and 150° C. wherein said solvent is maintained substantially in the liquid phase, and continuously removing an organic upper phase and recovering the desired methyl ketone therefrom.

16. A process according to claim 15 wherein the alpha-olefin is dodecene-1, the water soluble palladium salt is palladium chloride, and the water soluble inorganic oxidizing agent is copper chloride.

17. A process according to claim 14 wherein the solvent is methanol.

18. A process according to claim 14 wherein the solvent is dimethylformamide.

19. A process according to claim 14 wherein the solvent is dimethylacetamide.

20. A process for the preparation of carbonyl containing compounds which comprises:
adding an alpha-olefinically unsaturated hydrocarbon having between 6 and 40 carbon atoms per molecule and at least one hydrogen atom on each carbon atom of said alpha-olefinic double bond and an oxidizing gas containing free molecular oxygen as the only oxidant;
to a reaction mixture comprising water; a water soluble salt of a platinum group metal selected from the group consisting of platinum and palladium halides, sulfates and phosphates; as a redox system, an inorganic salt of a metal having an oxidation potential higher than that of the platinum group metal and capable of being re-oxidized by said oxidizing gas; the molar ratio of the sum of the redox metals to the platinum group metal being between 1:10 and 100:1; and a solvent which has a dielectric constant at 25° C. of at least 20 and is such that between 0.5 and 5 volumes of dodecene-1 are soluble at a temperature of 25° C. in a mixture of 50 volumes of solvent and 7 volumes of water; the amount of water in said reaction mixture being between 2 and 30 weight percent of said solvent;
the rate of addition of said alpha-olefin being equivalent to the rate at which the olefin is reacted;
under reaction conditions including a temperature between 0° and 150° C. such that the reactants are maintained in the liquid phase.

21. A process according to claim 20 wherein the solvent is selected from the group consisting of methanol, dimethylformamide, dimethylacetamide and ethanol.

22. A process which comprises:
adding an unsaturated monocarboxylic acid having between 6 and 40 carbon atoms and wherein the unsaturation in said hydrocarbon resides solely in a single olefinic double bond, and wherein there is at least one hydrogen atom on each carbon atom of said olefinic double bond and an oxidizing gas containing free molecular oxygen as the only oxidant;
to a reaction mixture comprising water; a water soluble salt of a platinum group metal selected from the group consisting of platinum and palladium halides, sulfates and phosphates; as a redox system, an inorganic salt of a metal having an oxidation potential higher than that of the platinum group metal and capable of being re-oxidized by said oxidizing gas; the molar ratio of the sum of the redox metals to the platinum group metal being between 1:10 and 100:1; and a solvent which has a dielectric constant at 25° C. of at least 20 and is such that between 0.5 and 5 volumes of dodecene-1 are soluble at a temperature of 25° C. in a mixture of 50 volumes of solvent and 7 volumes of water; the amount of water in said reaction mixture being between 2 and 30 weight percent of said solvent;
the rate of addition of said acid being equivalent to the rate at which the acid is reacted;
under reaction conditions including a temperature between 0° and 150° C. such that the reactants are maintained in the liquid phase.

23. A process according to claim 22 wherein the acid is 10-undecenoic acid.

24. A process for the preparation of a carbonyl containing compound which comprises
adding an unsaturated compound selected from the group consisting of hydrocarbons having between 6 and 40 carbon atoms per molecule and wherein the unsaturation in said hydrocarbons resides solely in from 1 to 4 olefinic double bonds and monocarboxylic acids having between 6 and 40 carbon atoms per molecule and wherein the unsaturation in said acids resides solely in a single olefinic double bond and wherein there is at least one hydrogen atom on each carbon atom of at least one of said olefinic double bonds in said unsaturated compound,
to a reaction mixture comprising an aqueous solution of a water soluble salt of a metal of platinum group, an oxidizing agent having an oxidation potential higher than that of said platinum group metal and a solvent which has a dielectric constant at 25° C. of at least 20 and is such that between 0.5 and 5 volumes of dodecene-1 are soluble at a temperature of 25° C. in a mixture of 50 volumes of solvent and 7 volumes of water, the amount of water in said aqueous solution being between 1 and 50 weight percent of said solvent.

References Cited
UNITED STATES PATENTS 3,076,032  1/1963  Riemenschneider et al.
                                                    260—533

DANIEL D. HORWITZ, *Primary Examiner.*